United States Patent
Dowling et al.

(10) Patent No.: US 8,881,404 B1
(45) Date of Patent: Nov. 11, 2014

(54) METHOD OF MANUFACTURING A SEAMLESS METAL CLAD POLYSTYRENE DOOR

(71) Applicants: Michael T. Dowling, Chestefield, MO (US); William D. Johnson, Rogersville, MO (US)

(72) Inventors: Michael T. Dowling, Chestefield, MO (US); William D. Johnson, Rogersville, MO (US)

(73) Assignee: Signature Hardware, LLC, Rogersville, MO (US)

( * ) Notice: Subject to any disclaimer, the term of this patent is extended or adjusted under 35 U.S.C. 154(b) by 0 days.

(21) Appl. No.: 13/849,718

(22) Filed: Mar. 25, 2013

Related U.S. Application Data

(63) Continuation of application No. 12/627,503, filed on Nov. 30, 2009, now abandoned.

(60) Provisional application No. 61/118,890, filed on Dec. 1, 2008.

(51) Int. Cl.
| | |
|---|---|
| *B21D 47/04* | (2006.01) |
| *B23K 26/26* | (2014.01) |
| *E06B 7/00* | (2006.01) |
| *B23K 9/09* | (2006.01) |

(52) U.S. Cl.
CPC .... *E06B 7/00* (2013.01); *B23K 9/09* (2013.01)
USPC .................... 29/897.32; 29/897.3; 29/525.14; 52/741.1

(58) Field of Classification Search
CPC .......... B23K 9/09; B23K 9/025; B23K 9/032; B23K 9/12; B23K 9/124; B23K 11/08; B23K 11/087; B21D 47/04; B21D 53/00; B29C 47/06; E06B 7/00
USPC ........... 29/897.3, 897.31, 897.32, 458, 469.5, 29/525.14, 460, 17.3, 904; 52/309.4, 52/309.8, 309.15, 783.12, 784.1, 784.12, 52/784.13, 741.1
See application file for complete search history.

(56) References Cited

U.S. PATENT DOCUMENTS

| | | | | |
|---|---|---|---|---|
| 2,023,661 | A | * | 12/1935 | Beyrle ........................ 52/784.11 |
| 5,072,488 | A | * | 12/1991 | Winyard ......................... 16/241 |
| 6,351,882 | B1 | * | 3/2002 | Weymer et al. ................. 29/458 |
| 6,694,702 | B2 | * | 2/2004 | Weymer et al. ............... 52/784.1 |
| 2007/0221631 | A1 | * | 9/2007 | Ruokolainen et al. ... 219/121.11 |

* cited by examiner

*Primary Examiner* — Sarang Afzali
(74) *Attorney, Agent, or Firm* — Harness, Dickey & Pierce, P.L.C.

(57) ABSTRACT

A method of making a seamless edge, metal clad door having foam or polystyrene core, wherein the seam can be welded by cold metal transfer (CMT) welding without melting the polystyrene. The welded seam is appropriately finished by grinding, if necessary, and painting to produce a door with completely seamless edges. The invention encompasses a seamless edge door manufactured by the disclosed process and equivalents thereof.

3 Claims, 7 Drawing Sheets

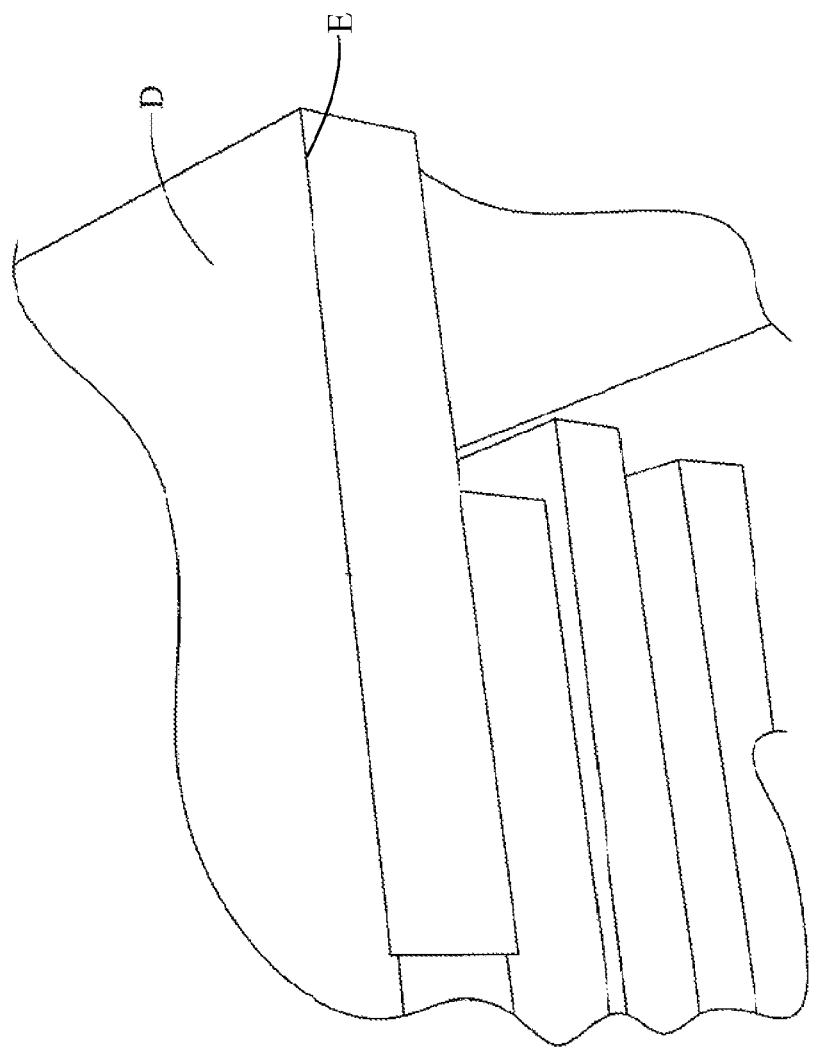

METHOD OF MANUFACTURING A SEAMLESS METAL CLAD POLYSTYRENE DOOR

CROSS-REFERENCE TO RELATED APPLICATIONS

This application is a continuation application of U.S. patent application Ser. No. 12/627,503, filed Nov. 30, 2009, now abandoned, which claims priority to U.S. Provisional Patent Application No. 61/118,890, filed Dec. 1, 2008. The entire disclosures of each of the above applications are incorporated herein by reference.

BACKGROUND OF THE INVENTION

The invention relates generally to doors, and more specifically, to method of making metal clad doors having a foam or polystyrene core with seamless edges.

Doors having a foam or polystyrene core with an outer cladding of metal, such as steel, are known. Conventionally, these doors are constructed by enclosing the polystyrene door in the metal sheeting. The metal sheeting comprises a front metal sheet and a back metal sheet, the sheets commonly referred to as door blanks. The door blanks abut where they are wrapped or folded around the peripheral edges of the door, leaving a seam or gap between the two blanks along the peripheral edges of the door. In most instances, to make a door that appears seamless along the edges, the seam is spot welded at six (6) to twelve (12) inch intervals to secure the sheets around the door at the peripheral edge. Spot welding is used because the polystyrene melts under the high heat that would be required to run a weld bead along the entire length of the seam. Once the seam is spot welded, the seam then is filled with a filler material or putty, such as Bondo® (3M) or other appropriate material. The filled seam is sanded and the door is painted. This process is time consuming and can take about 30 to 40 minutes or more per door. The quality and aesthetic appearance of the seamless edge can vary depending upon the filling and sanding steps.

It would be advantageous, therefore, to have a method of manufacturing a steel clad door with a polystyrene core that has an improved seam weld that will not melt the polystyrene core and improves the fit and finish of the door having seamless peripheral edges.

SUMMARY OF THE INVENTION

A method of making a seamless edge, metal clad door having a foam or polystyrene core wherein the seam can be welded without melting the polystyrene. The welded seam is appropriately finished by grinding and painting to produce a door with seamless edges. The invention encompasses a seamless edge door manufactured by the disclosed process and equivalents thereof.

BRIEF DESCRIPTION OF THE DRAWINGS

FIG. 7 is a portion of a seamless welded edge of a metal door.

DETAILED DESCRIPTION

Figure 1:
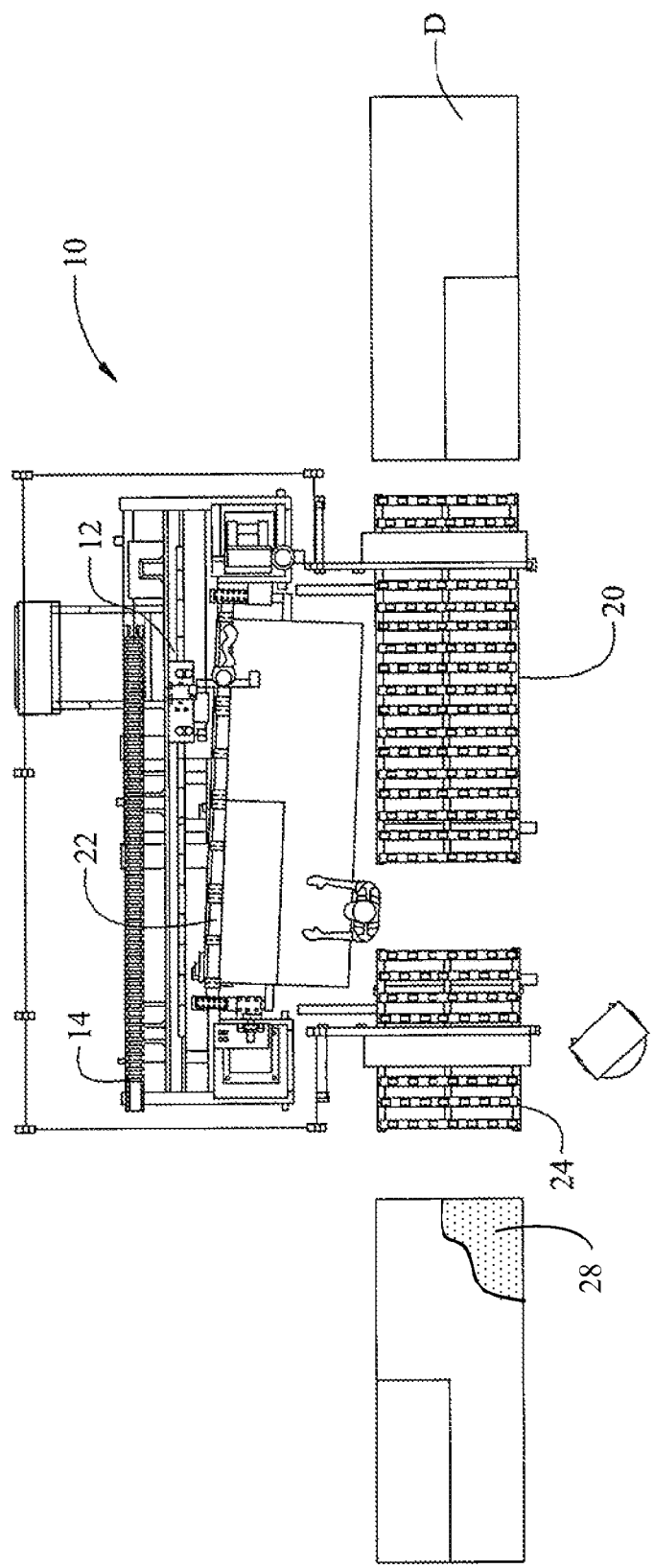
FIG. 1 is a top plan view of one aspect of the method with the door secured in the positioner prior to welding.

The present method comprises making a seamless edge, metal clad door having foam or polystyrene core wherein the seam can be welded without melting the polystyrene. The seam is welded using cold metal transfer (CMT) welding. Once the seam is welded, the welded seam is further finished by grinding, if necessary, and painting to produce a door with seamless edges. The invention encompasses the seamless edge door manufactured by the disclosed process and equivalents thereof.

Prior to application of the welding process, a door to be welded can be assembled in any appropriate manner. By way of example, the doors are constructed by enclosing the polystyrene core (not seen) in the metal sheeting. The metal sheeting comprises a front metal sheet and a back metal sheet; the sheets are commonly referred to as door blanks. The door blanks abut where they are wrapped or folded around the peripheral edges of the door, leaving a seam or gap between the two blanks along the peripheral edges of the door. It is this seam or gap that is finished smoothly employing the methods of the present invention resulting in a seamless door.

An assembly for operating the method of manufacture of a seamless edge door of the present invention is indicated generally in the drawings by reference number 10 in the drawings. Assembly 10 includes a cold metal transfer (CMT) track welder 12 operably attached to a track 14.

It will be understood that "cold" is a relative term in perspective to welding. The work pieces to be joined, as well as the weld zones, remain considerably "colder" in the cold metal transfer process (CMT) than they would with conventional gas metal arc welding. The cold metal transfer process is based on short circuiting transfer, that is, on a deliberate, systematic discontinuing of the arc. Results are a sort of alternating "hot-cold-hot-cold" sequence. The welder includes an arc welder tip 16 and welding wire 18. In one embodiment of the invention, the welding wire can be 0.045 (1.2 mm) silicone bronze welding wire. Aluminum bronze welding wire or any other appropriate welding wire may be employed.

During operation of the assembly, the welding wire is fed to the seam adjacent the welder tip at a predetermined rate. One feature of the present invention is that the motions of the wire 18 have been integrated into the welding process and into the overall management of the procedure. Every time short circuiting occurs, a digital process control interrupts the power supply and controls the retraction of the wire. The forward and back motion of the wire takes place at a rate of up to 70 times per second. The wire retraction motion aids droplet detachment during the short circuit. The fact that electrical energy is converted into heat is both a defining feature and sometimes critical side effect of any arc welding. Ensuring minimal current metal transfer by the methods of the present invention greatly reduces the amount of heat generated in the work piece and keeps the polystyrene core from melting or burning. The arc only inputs heat into the materials to be joined for a very short time during the arcing period because of the interruption in the power supply. The reduced thermal input offers additional advantages, such as low distortion of and higher precision. Benefits include higher-quality welded joints and freedom from spatter.

Figure 2:
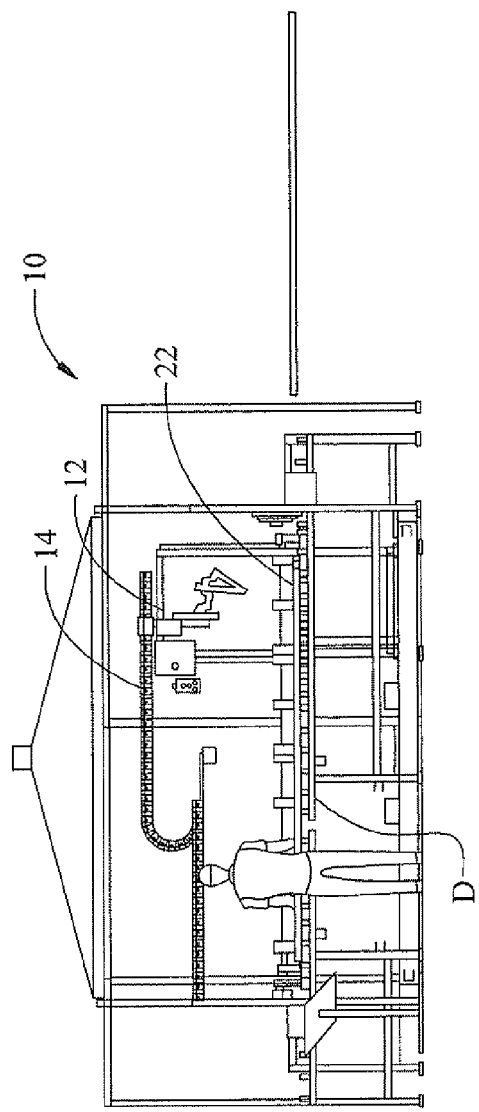
FIG. 2 is a front elevational view thereof.
Figure 3:
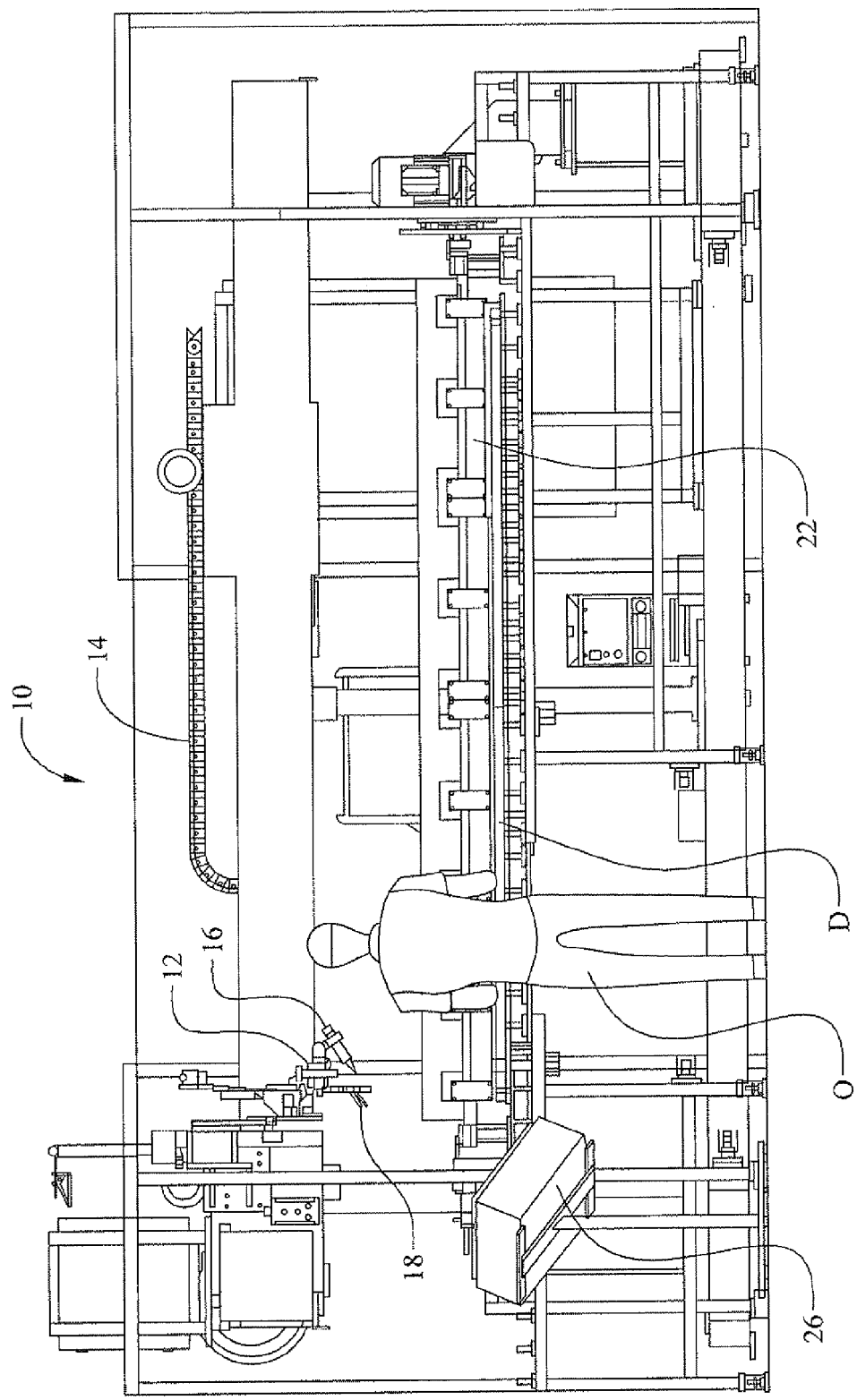
FIG. 3 is another front elevational view thereof.

In any event, assembly 10 is intended to weld seams of a metal clad door D having a foam core 28, such as a polystyrene core, as previously described. The doors generally are preassembled. A door can be placed on a lift table and moved to a first roller table 20. As seen in FIGS. 1 through 3, door D is lying flat with a peripheral edge disposed toward the welding assembly. An edge of the door to be welded is secured in a work piece positioner 22.

Figure 4:
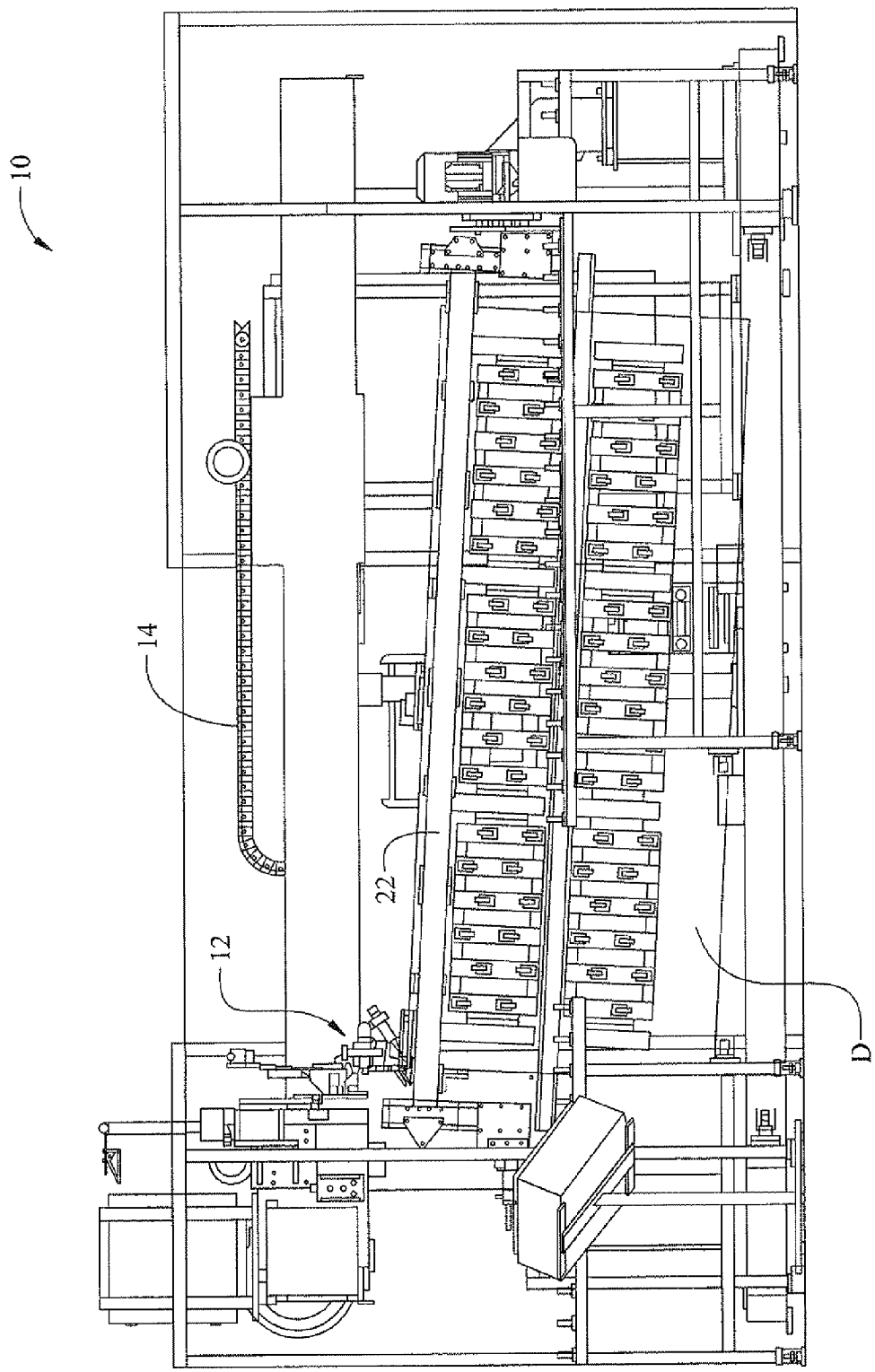
FIG. 4 is a front elevational view thereof with the door rotated and the welder at the head of the welding cycle.
Figure 5:
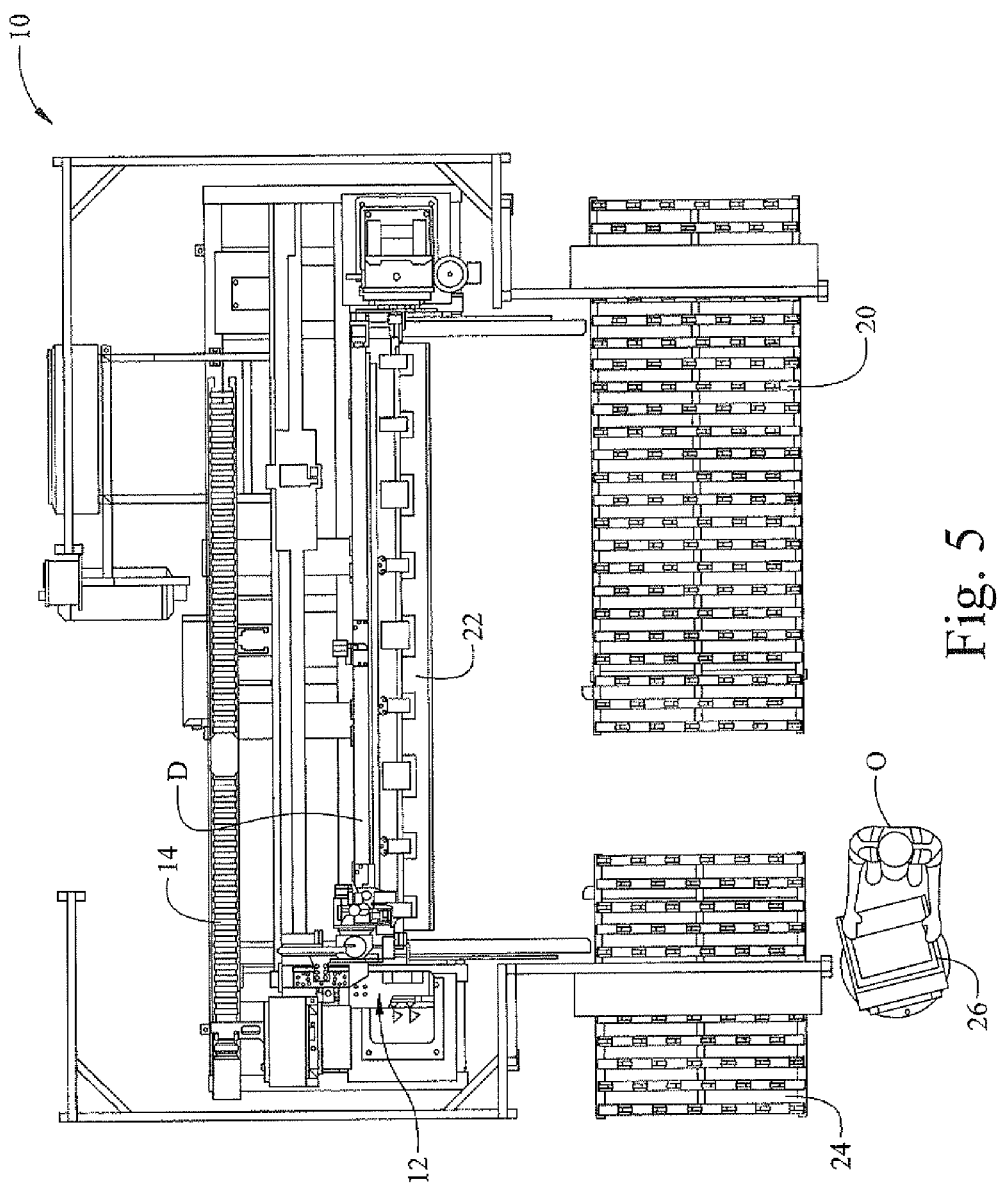
FIG. 5 is a top plan view thereof.
Figure 6:
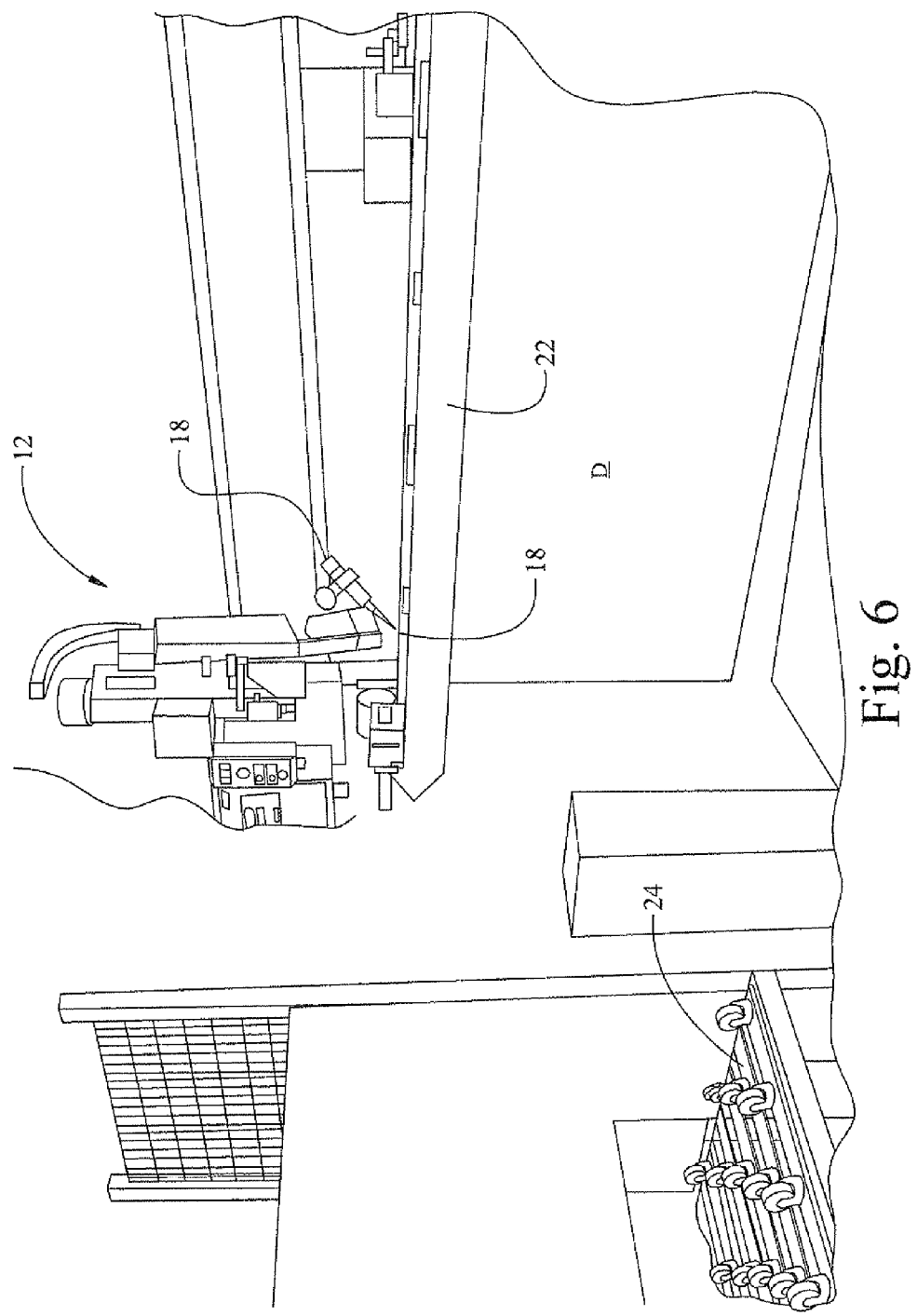
FIG. 6 is a perspective view of the door in the positioner and the welder at the head of the welding cycle.

Referring to FIGS. 4 through 6, positioner 22 rotates so that the door is in a vertical orientation and the edge of the door is positioned under track welder 12. It should be noted that positioner 22 includes water jackets that provide cooling water through the positioner to further cool the door during the welding process as another measure to keep the polystyrene core from being damaged.

It also will be appreciated from the drawings, that door D is positioned with the edge under the track welder at a downward angle. During the welding process, the welder moves from the upper end to the lower end of the door edge. One illustrative rate of movement of the welder along the edge of the door is approximately 80 (eighty) inches per minute. This downward angle improves the flow of the melted welding wire down the seam and improves the weld quality.

In any event, as the welder moves down the edge E of the door, the welding wire is pulsed to the seam and exposed to welding heat at a rate of about 70 times per second. In between the wire pulses, the heat is discontinued and wire is retracted. Due to the optimum rate of wire pulses a relatively smooth weld is created along the seam, as shown in FIG. 7. Moreover, this process prevents damage to the foam core.

Once the door seam is welded, positioner 22 is rotated so the door is lying flat and the door edge can be removed from the positioner. The door can be turned and the opposite edge installed in the positioner and the welding process repeated to seal the seam on the opposite peripheral edge. The door then is rotated back to a flat position and removed from the assembly by sliding it along a second roller table 24.

It will be noted that the functions of the assembly can be centrally controlled by an operator O using an operator control 26. Control 26 can include a computer employing appropriate software to control the functions of the welder, the wire feed, the positioner, and so forth.

Once the edges are welded there generally is a flawless weld. However, some light finishing may be required. The weld can be ground smoother if necessary. Finally, the door can be painted, resulting in a door having completely seamless edges.

It will be appreciated that various changes and modifications may be made in the particulars of the assembly used to operate the method of manufacturing a seamless door without departing from the broader scope of the invention. The foregoing description includes basic elements and procedures of the method of manufacture. It will be understood that ancillary structures, such as the appropriate safety equipment and so forth would be employed. Likewise, ancillary door movement and finishing steps also may be employed.

The invention claimed is:

1. A method of making a seamless edge, metal clad door having foam or polystyrene core prefilled or preassembled comprising:
   placing the metal clad door having a peripheral edge seam on a lift table;
   welding the peripheral edge seam using cold metal transfer welding having an effective rate of pulses for motions of a welding wire;
   positioning the metal clad door at a downward angle for improving a flow of the welding wire melted down the seam;
   cooling the metal clad door during the welding with at least one water jacket; and
   rotating the metal clad door for continuing the welding to seal the peripheral edge seam resulting in the metal clad door having seamless edges without melting the foam or polystyrene core.

2. The method of claim 1, further comprising a step of grinding the welded seam.

3. The method of claim 2, further comprising the step of painting the door after the welding and the grinding.

* * * * *